July 20, 1948.  A. A. DURANT  2,445,475
CLAMP
Filed Feb. 17, 1947
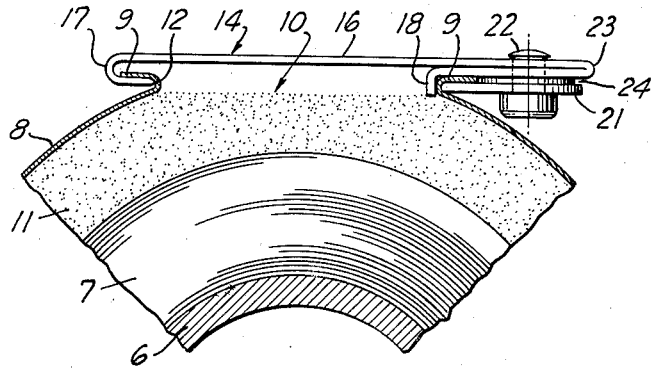
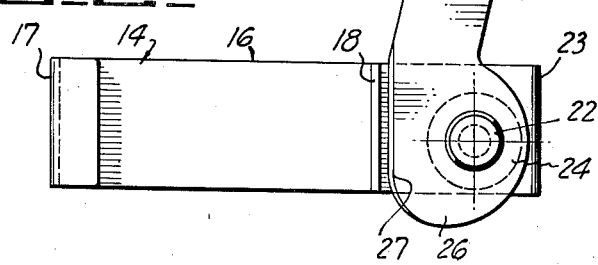
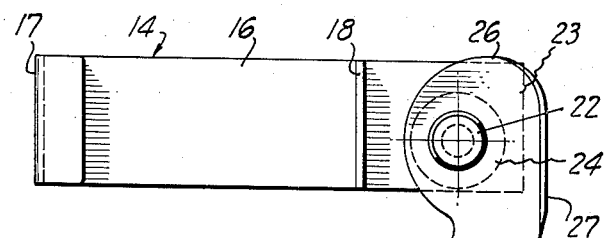
INVENTOR
Albert A. Durant
BY
Robert H. Sexnoff
ATTORNEY Patented July 20, 1948

2,445,475

UNITED STATES PATENT OFFICE 2,445,475

CLAMP

Albert A. Durant, Honolulu, Territory of Hawaii

Application February 17, 1947, Serial No. 729,155

2 Claims. (Cl. 24—84)

This invention relates to improvements in clamps.

In my prior Patent No. 2,405,021 dated July 30, 1946, I have disclosed the manufacture of an insulated pipe wherein a length of pipe is provided with a concentric layer of heat insulating material. An outer tubular metallic shell is supported in a spaced, concentric relation to the pipe and to its heat insulation covering, the edges of the metal covering being spaced apart to provide a longitudinal slot-like opening through which a suitable protective and sealing material for the heat insulation is applied such as bitumen, asphalt or the like. The sealing material is poured in while hot and then permitted to cool so that it solidifies in place and provides an effective seal between the outer metal shell and the insulation.

The clamp of the present invention enables the edges of the metal shell to be positioned and maintained in a spaced parallel relationship, the clamp occupying only a very small space across the slot so that the asphalt pouring operation can proceed without interference. Once the bitumen or asphalt has set in place, the clamp is readily removed and a suitable covering device applied to the slot.

It is in general the broad object of the present invention to provide a novel clamp, particularly one suited to maintain the edges of a metal sheet in a parallel spaced relationship.

The invention includes other objects and features of advantage, some of which, together with the foregoing, will appear hereinafter wherein the present preferred form of clamp of this invention is disclosed.

In the drawings accompanying and forming a part hereof,

Figure 1 is a side elevation, partly in section, showing the clamp of the present invention in position upon a length of insulated pipe during the course of fabrication in accordance with the method taught by the aforementioned patent.

Figure 2 is a plan view of the clamp with the several elements thereof disposed in clamping position.

Figure 3 is a view of the clamp with the several elements thereof in clamp open position.

Referring to the drawings, a suitable tubular pipe 6 is provided with a concentric layer of heat insulating material 7. An outer tubular shell 8 is provided about the heat insulating material and concentrically with respect to the pipe 6. The edges 9 of the sheet 8 are positioned in a fixed spaced parallel relation to one another to provide slot-like opening generally indicated by numeral 10 and through which asphalt or bitumen or the like is poured. The spaced parallel edges of the metal sheet are preferably turned back upon the sheet to form a U-shaped lip 12.

In accordance with this invention, I provide a clamp generally indicated by numeral 14 and comprising a spacer member 16 having a hook 17 formed at one edge thereof to engage one of the U-shaped lips 12 formed along the edge of the metal sheet 8. Intermediate the ends of the spacer member, I provide a projecting member 18 in such a position that it engages the inner edge of one of the U-shaped lips 12 to position the two edges in a desired spaced relation to one another. Preferably, the projecting member is formed by suitably bending the spacer member back upon itself to provide projecting member 18 as a downwardly extending projection, as appears particularly in Figure 1.

To secure the spacer member in position, means are provided for securing the spacer member in an engaging position with the two U-shaped lips. In the form of clamp as shown in the drawing, this means comprises lever 21 hingedly mounted upon a rivet 22, the rivet extending through the projecting end 23 of the spacer member 16. A washer 24 is preferably positioned between the clamp member 21 and the projecting end 23 of the spacer member so that lip 9 fits between the lever 21 and the projecting end 23 of the spacer member.

Lever 21 is formed with a cam-like end 26 at one end thereof to force the lip 9 in against the projecting member 18, the cam-like portion 26 terminating in a locking portion 27 which rests against the inner or bottom edge of the U-shaped lip to retain the lever 21 temporarily in a locked position.

With the metal sheet in concentric position with respect to pipe 6, several of the clamps are disposed along the length of the metal sheet to retain the edges thereof in a desired fixed, spaced and parallel relation to one another during the pouring operation and during the subsequent cooling of the asphalt. When it is desired to close the space between the lips 9, the clamps can be readily removed, the levers being moved from the position in which they appear in Figures 1 and 2 to the open position in which the lever is shown in Figure 3.

From the foregoing, I believe it will be obvious that I have provided a relatively novel and simple form of clamp for securing adjacent but spaced edges of a metal sheet in a fixed spaced parallel relation to one another.

I claim:

1. A clamp for securing adjacent but spaced edges of a metal sheet in a fixed spaced parallel relation to one another, each of said metal sheet edges being turned back upon the sheet to form a U-shaped lip along the sheet edge, said clamp comprising a spacer member having a hook at one end to engage one of said U-shaped lips, a projecting member on said spacer member for engaging the base of the other U-shaped lip to position said sheet edges in a parallel spaced relation to one another, and means for securing said spacer member in an engaging position with said sheet edges.

2. A clamp for securing adjacent but spaced edges of a metal sheet in a fixed spaced parallel relation to one another, each of said metal sheet edges being turned back upon the sheet to form a U-shaped lip along the sheet edge, said clamp comprising a spacer member having a hook at one end to engage one of said U-shaped lips, a projecting member on said spacer member for engaging the base of the other U-shaped lip to position said sheet edges in a parallel spaced relation to one another, and a lever hinged on said spacer member cooperatively adjacent the projecting member, said lever having a latch portion thereon for engaging the other U-shaped lip to force the lip against the projecting member to latch the U-shaped lips in a spaced parallel relation.

ALBERT A. DURANT.